United States Patent [19]

Lee

[11] Patent Number: 5,275,797
[45] Date of Patent: Jan. 4, 1994

[54] METHOD OF PRODUCING BARIUM CARBONATE

[75] Inventor: Yuan-Haun Lee, Taipei, Taiwan

[73] Assignee: Yee Fong Chemical & Ind. Co., Ltd., Taipei, Taiwan

[21] Appl. No.: 25,136

[22] Filed: Mar. 2, 1993

[51] Int. Cl.$^5$ .............................................. C01F 11/18
[52] U.S. Cl. .................................. 423/431; 423/566.3
[58] Field of Search ............ 423/431, 168, 170, 566.3; 268/44

[56] References Cited

U.S. PATENT DOCUMENTS 3,944,685  3/1976  Gunnerman ........................ 423/170

FOREIGN PATENT DOCUMENTS 1271126  4/1972  United Kingdom ................ 423/431

Primary Examiner—Gregory A. Heller
Assistant Examiner—Stuart L. Hendrickson
Attorney, Agent, or Firm—Edward S. Irons

[57] ABSTRACT

A method is disclosed for producing barium carbonate by adding barium sulfate to coal tar pitch maintained at a temperature of about 350° C. to about 450° C., and thereafter heating the reactants to a temperature between 700° C. to 950° C. in a second stage. The second stage reaction product is reacted with an alkali metal carbonate.

3 Claims, 5 Drawing Sheets

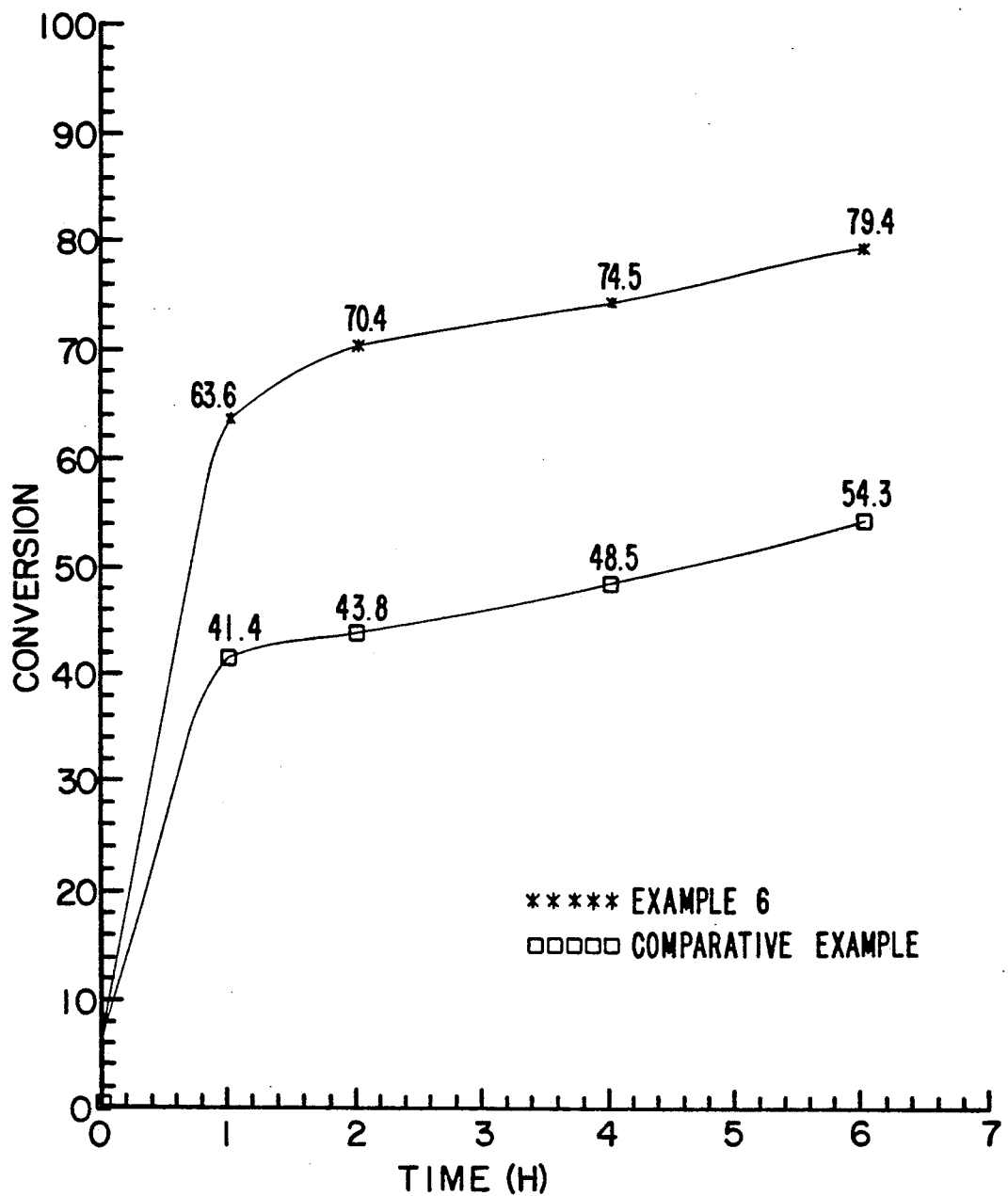
F I G. 3

METHOD OF PRODUCING BARIUM CARBONATE

FIELD OF THE INVENTION

This invention relates to a novel method for producing barium carbonate suitable for use as an additive for enhancing the physical properties of glass, ceramic ware, permanent magnet and the like, and for reacting with titanium dioxide to manufacture barium titanate of ceramics having a strong dielectric characteristic.

BACKGROUND OF THE INVENTION

Due to its unique characteristics, barium carbonate is considered a versatile chemical for use as an additive for enhancing the physical properties of glass, ceramic ware, permanent magnet and the like, and for reacting with titanium dioxide to manufacture barium titanate of ceramics having a strong dielectric characteristic.

Conventionally, barium carbonate is produced by first reducing a barium sulfate by coke at an elevated temperature (1150°-1200° C.) to form a soluble barium sulfide, which is then reacted with alkali metal carbonate or bicarbonate to form a barium carbonate. The reaction scheme of the above process is as follows:

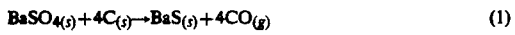

$$BaSO_{4(s)} + 4C_{(s)} \rightarrow BaS_{(s)} + 4CO_{(g)} \qquad (1)$$

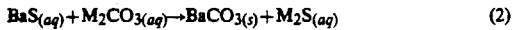

$$BaS_{(aq)} + M_2CO_{3(aq)} \rightarrow BaCO_{3(s)} + M_2S_{(aq)} \qquad (2)$$

wherein the M is Ma or K.

In the above reactions, the quality of the resulting barium carbonate depends upon the purity and activity of coke. Generally, reducing potential of coke in the reaction is low because of the relatively low reducing activity of coke itself and the limited contact area of the granular form of coke, and therefore the purity and yield of the barium carbonate obtained by the above process are not satisfactory. In addition, the reaction must be carried out at an elevated temperature, therefore, more sophisticated heat resistant facilities and extra-fuel for heating up the reaction are needed.

In order to overcome the above mentioned disadvantages of the conventional method for producing barium carbonate, the inventor has studied extensively on this subject and found that barium carbonate of high purity can be produced with a high yield according to the following method: heating coal tar pitch to a specific temperature to form mesophase and adding barium sulfate to react with the mesophase, and then heating the reactants to a desired temperature after maintaining the temperature for a predetermined period of time, and finally, reacting the resulting mixture with alkali metal carbonate or bicarbonate to convert into barium carbonate. This invention provides such an improved method.

Therefore, the object of present invention is to provide a novel method for producing barium carbonate.

SUMMARY OF THE INVENTION

The method for producing barium carbonate according to this invention includes the steps of cultivating a mesophase by rapidly heating coal tar pitch to a specific temperature under the atmosphere of nitrogen, adding barium sulfate to react with the mesophase, and then heating the reactants to a desired temperature after maintaining the temperature for a prodertmined period of time, and finally, reacting the resulting mixture with alkali metal carbonate or bicarbonate to produce the barium sulfate with a high yield and high purity.

In detail, the method for producing barium carbonate according to this invention includes the steps of heating coal tar pitch at a rate of 10° C./min to reach a temperature between 350° C. and 450° C. (preferably 390°-420° C.) under the atmosphere of nitrogen to cultivate a mesophase, adding barium sulfate powder to the mesophase under stirring after maintaining the temperature for a period of 8-16 hours (preferably 12-16 hours), heating the reactants at a rate of 1°-2° C./min to reach a temperature between 700° C. and 950° C. (preferably 800°-900° C.) and maintaining the temperature for a period of 3 hours then cooling the resulting mixture to the room temperature and then pulverizing the mixture, dissolving the mixture in the boiling water, filtering the aqueras solution to remove the water insoluble and unreacted barium sulfate and coal tar pitch, then washing several times with hot water, reacting the obtained filtrate (barium sulfide aqueous solution) with alkali metal carbonate (for example, sodium carbonate and potassium carbonate) or alkali metal bicarbonate (for example, sodium bicarbonate and potassium bicarbonate) aqueous solution to afford a white precipitation of barium carbonate, and finally collecting the barium carbonate powder after filtering, washing and drying.

The barium carbonate produced by the method of present invention has a better reactivity than the commercial ones while it is further reacted with titanium dioxide to form barium titanate. Moreover, one of the starting materials used for producing barium carbonate is the waste, containing barium sulfate, obtained from electrolysis process of sea water instead of the conventionally used witterite. Still, it has the economical value that the high purity barium carbonate produced by the method of present invention can be further reacted with titanium dioxide to form barium titanate using as an ingredient of ceramic material and photosensitive glass.

DETAILED DESCRIPTION OF THE INVENTION

The thermally treated and mesophase-cultivated coal tar pitch sample is solidized after cooling. The molecular arrangement of the mesophase solid microscopically featuring distinctively different properties, absorptively and scatteringly, between the directions vertical and horizontal to the direction of the molecular arrangement while an incident light travels through the surface of the material, results in anisotropic. Due to the anisotropic, the other liquid crystal phase is formed in the pitch, therefore, the mesophase can be analyzed by optical microscope. However, the means of observation for the anisotropic can be divided into the direct observation of liquid surface and the sectional observation. The liquid surface of the sample becomes smooth and flat after cooling, therefore, it can be directly observed under polarizing microscope or observed after the debris of the sample was fringed with epoxy resin, ground with SIC sand paper gradually being changed the grains from coarse to fine, and then polished with $Al_2O_3$ power.

FIG. 4, the picture of the coal tar pitch having been treated at 460° C. for a period of one hour observed under polarizing microscope at ambient temperature, can be divided into two parts: melt liquid surface and wall surface; the ball-shaped convex is observed from the liquid surface while the flow trail is only seen on the wall surface. The tiny ball of mesophase can be seen from each polished surface, the grain and ball-shaped convex are pretty consistent, therefore, it is shown that the convex is mesophase and the tiny ball is the room for coal tar pitch itself to adhere or coat.

The picture, FIG. 5, of the coal tar pitch having been thermally treated at various temperatures and various times, was observed under polarizing microscope. The morphology of the mesophase of the coal tar pitch observed after heat treatment can be seen in FIG. 5; the show-up frequency of the mesophase depends upon the temperature and heating time, and the morphology of the mesophase is obviously changed while varying the temperature between 380° C. and 420° C., normally, the characteristic temperature at 410° C. is the critical temperature for the proliferation of tiny ball of the mesophase and the formation of the mesophase flow-body. The change of the occupation area ratio, i.e. volume ratio, which is compiled and calculated by means of quantitative morphology in the polished specimen is shown in FIG. 6. Obviously, these observations provide the evidence for the differences in surface morphology of mesophase formed at different temperatures.

The following examples are used for the further detailed description of present invention, but not for the limitation of the scope of present invention.

EXAMPLE 1

Heat coal tar pitch at a rate of 10° C./min to reach 410° C. under the atomosphere of nitrogen, add barium sulfate to the pitch (wherein the weight ratio of coal tar pitch to barium sulfate is 2:1) after maintaining this temperature for a period of 16 hours, subsequently, heat the reactants at a rate of 2° C./min to reach 800° C. and maintain the temperature for 3 hours, then cool the resulting mixture to the room temperature and pulverize the mixture, dissolve the obtained product in the boiling water, filter the aqueous solution to remove the insoluble materials and then wash with hot water several times, react the filtrate with sodium carbonate aqueous solution to give the precipitation of barium carbonate, finally collect the resulting barium carbonate powder (yield: 63.9%) after filtering and drying.

EXAMPLE 2

Repeat the process as described the example 1, but the weight ratios used of coal tar pitch to barium sulfate are 2:2, 2:3, 2:4, 2:5 and 2:6, respectively. The yields of the obtained barium carbonate are as shown in FIG. 2.

EXAMPLE 3

Repeat the process as described in the example 1, but the weight ratios used of coal tar pitch to barium sulfate are 2:1, 2:2, 2:3, 2:4, 2:5 and 2:6, respectively, and the temperature in the second stage is changed to 700° C. The results of the reactions are shown in FIG. 2.

EXAMPLE 4

Repeat the process as described in the example 3, but the temperature in the second stage is changed to 850° C. The results of the reactions are shown in FIG. 2.

EXAMPLE 5

Repeat the process as described in example 3, but the temperature in the second stage is changed to 950° C. The results of the reactions are shown in FIG. 2.

As shown in FIG. 2, it is clear that the yield of the reaction is the optimum while the weight ratio used of coal tar pitch to barium sulfate is 2:2, again, the yield is the optimum while the temperature in the second stage is 800° C.

EXAMPLE 6

Heat coal tar pitch at a rate of 10° C./min to reach 410° C. under the atmosphere of nitrogen, add barium sulfate (weight ratio of 1:1) to the pitch under stirring after maintaining the temperature for a period of 8 hours, then heat the reactants to reach 800° C., and maintain the temperature for 1, 2, 4 and 6 hours, respectively, and react the resulting mixtures individually with sodium carbonate aqueous solution. The results of the reactions are shown in FIG. 3.

COMPARATIVE EXAMPLE

Heat the mixture of coal tar pitch and barium sulfate with a weight ratio of 1:1 straight to reach 800 C. under the atmosphere of nitrogen, maintain the temperature for 1, 2, 4 and 6 hours, respectively, and then react the resulting mixtures individually with sodium carbonate aqueous solution. The obtained results are listed in FIG. 3.

As the results shown in FIG. 3, it is clear that the conversion of present invention is double of that of the comparative example, obviously, the efficiency of the reactions employed in present invention is superior to that employed in the conventional methods.

BRIEF DESCRIPTION OF THE DRAWINGS

FIG. 3 shows comparison figures of the conversions for the method of present invention and the conventional method(s).

Figure 1:
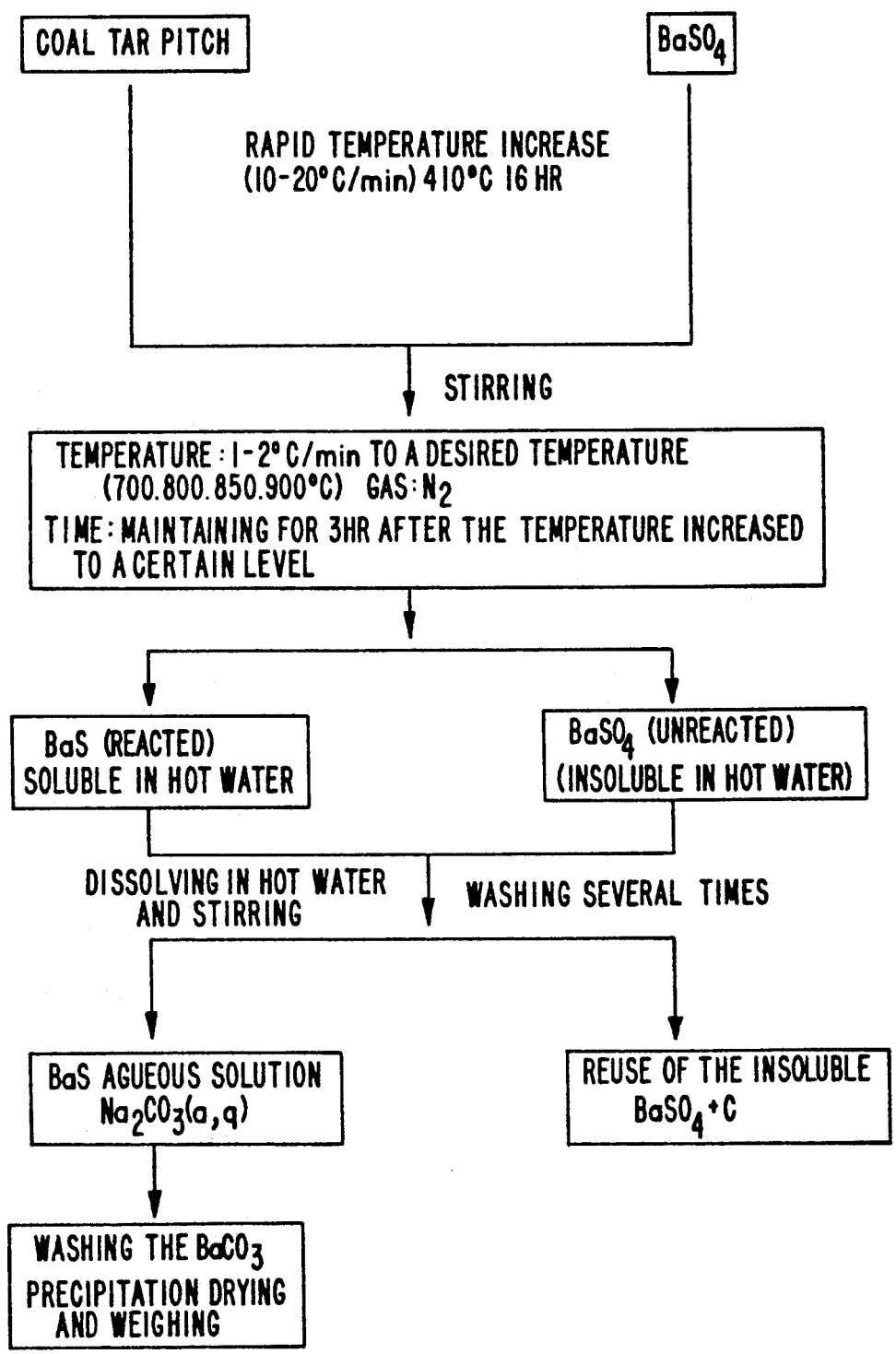
FIG. 1 shows the flowchart of the producing process for the method of present invention.
Figure 2:
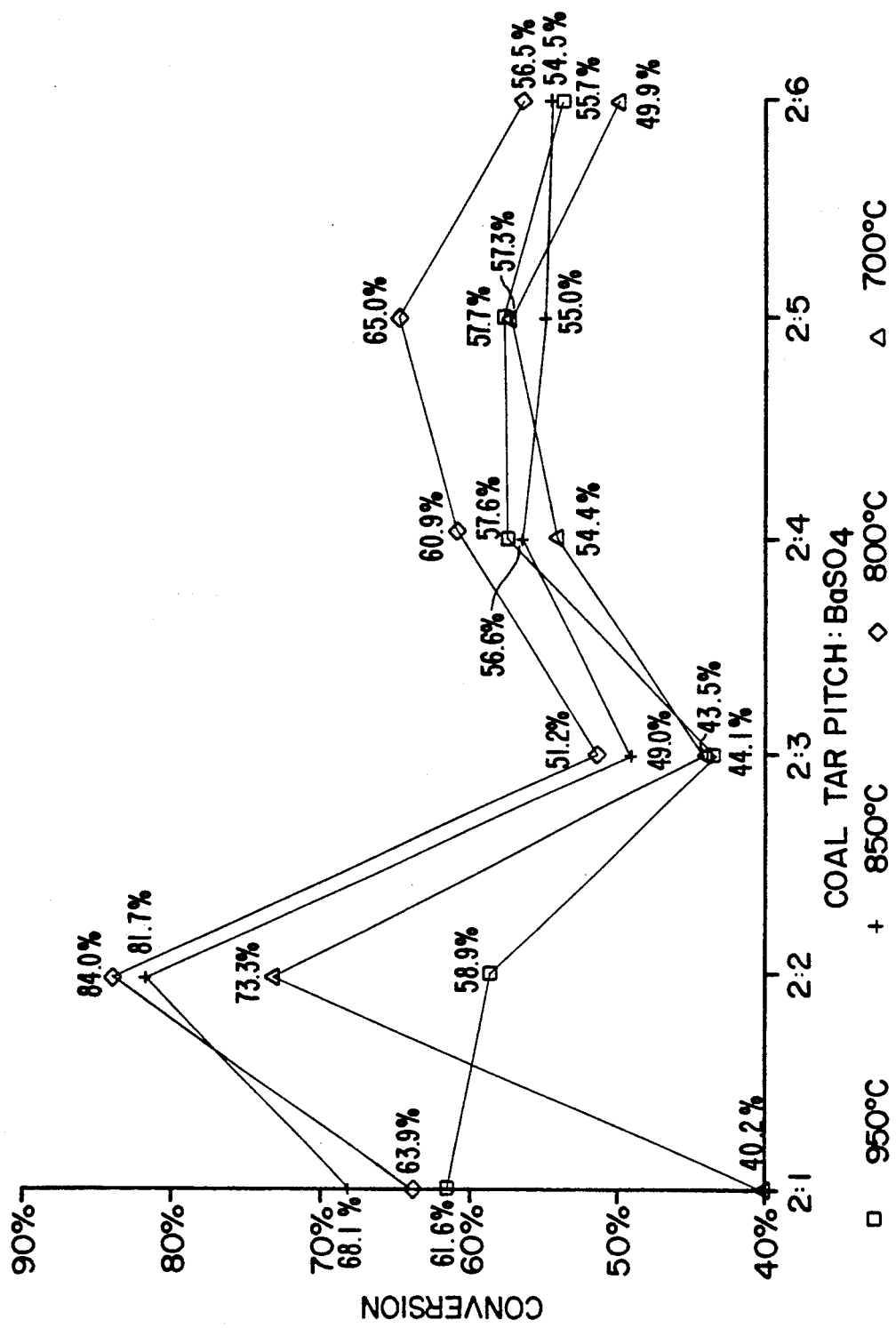
FIG. 2 shows the results obtained from the reaction at various conditions according to the method of present invention.
Figure 4:
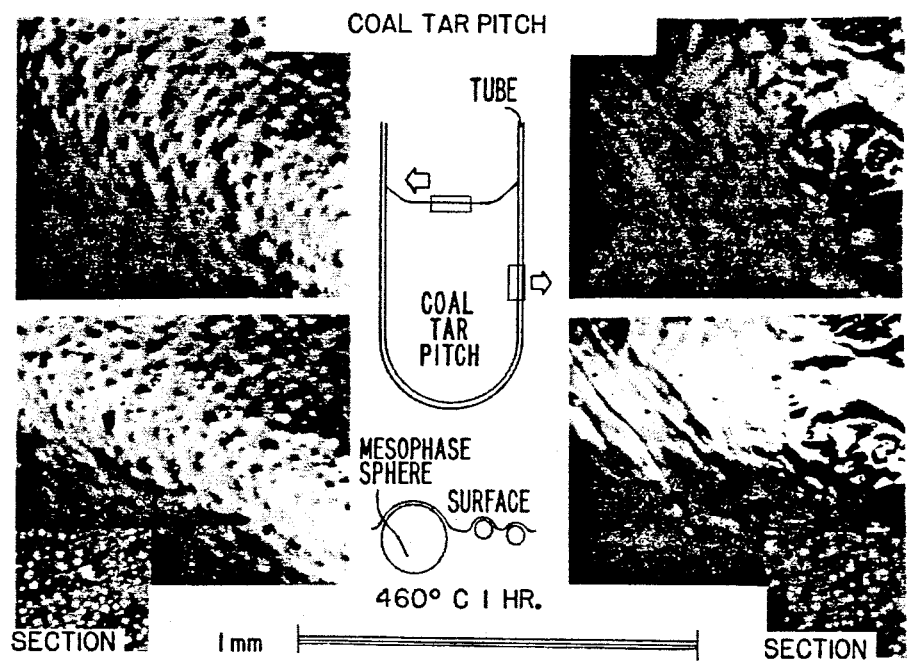
FIG. 4 shows the microscopic morphology of coal tar pitch directly observed from the surface after heat treatment.
Figure 5:
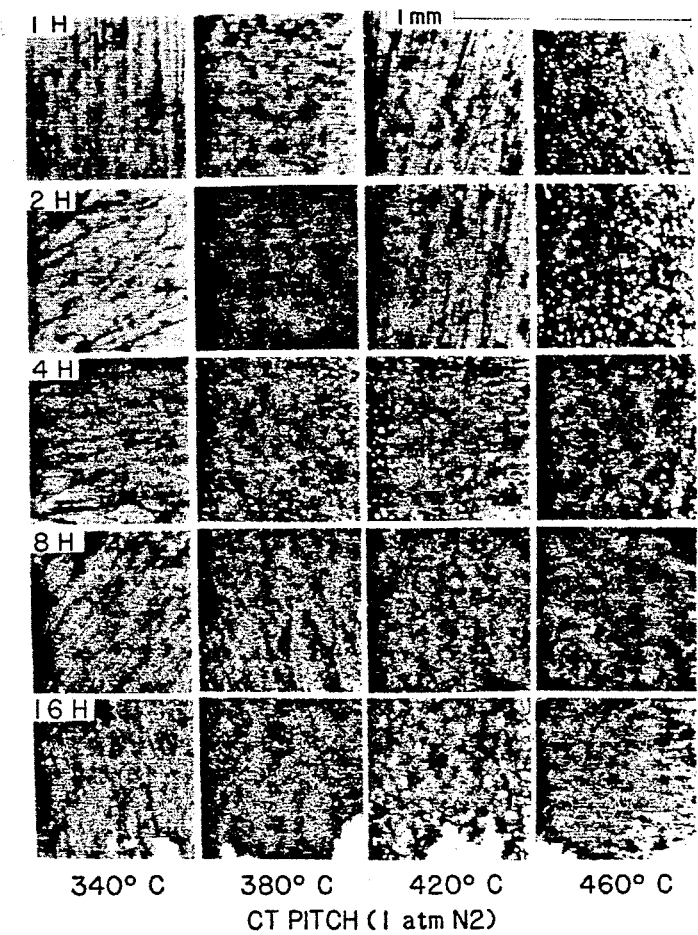
FIG. 5 shows the change of the sectional microscopic morphology of coal tar pitch after heat treatment.
Figure 6:
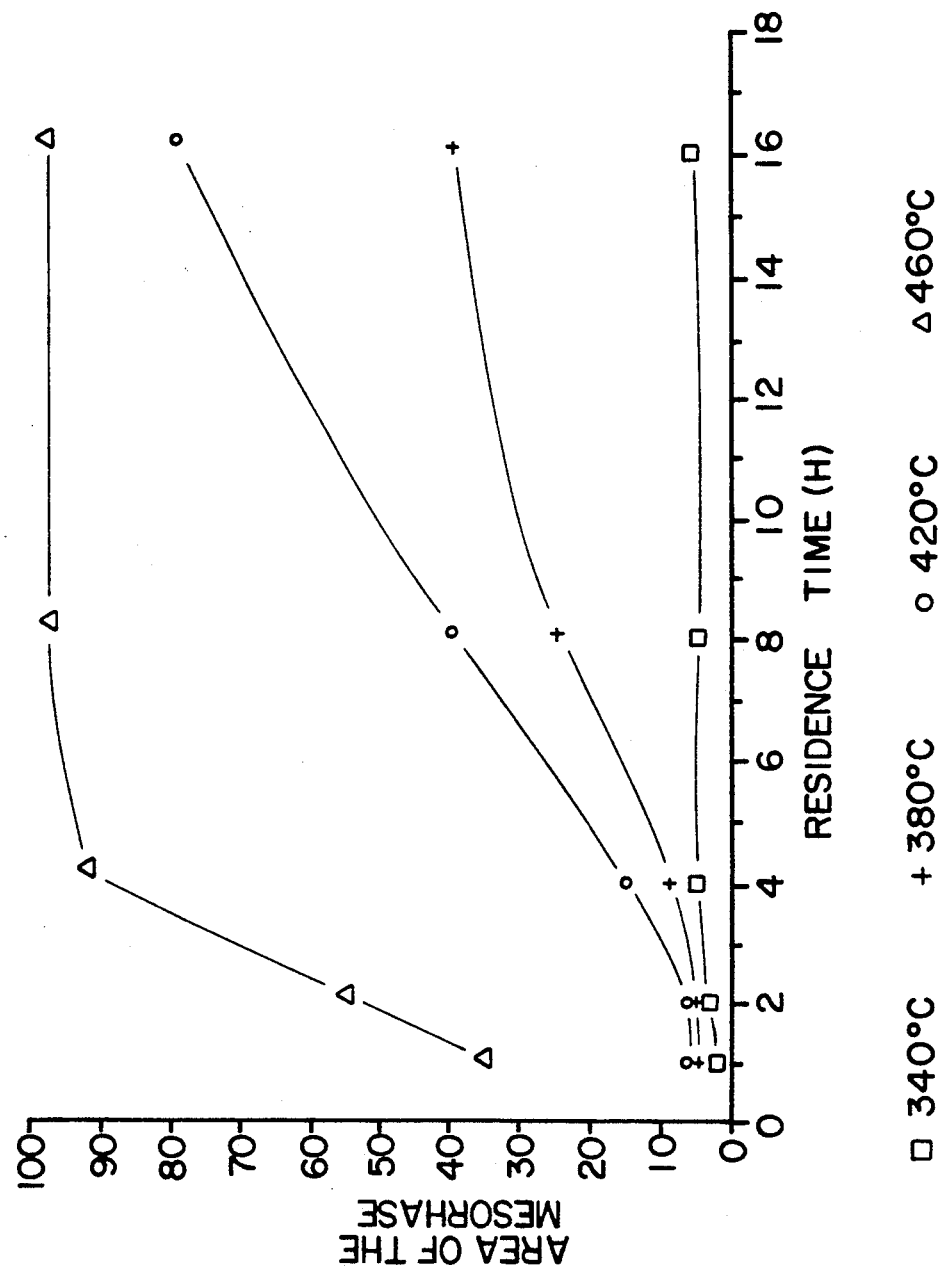
FIG. 6 shows the change of the occupation ratio of mesophase of the coal tar pitch after heat treatment.

What is claimed is:

1. A method of producing barium carbonate comprising the steps of
   a) heating coal tar pitch at a rate of 10° C./minute to a temperature between 350° C. and 450° C., maintaining the temperature for 8-16 hours to form mesophase pitch;
   b) adding barium sulfate to said mesophase pitch to form a reaction mixture, wherein the weight ratio of coal tar pitch in step a) to barium sulfate is between 2:1 and 2:6;
   c) heating said reaction mixture to a temperature between 700° C. and 950° C. to form barium sulfide; d) recovering said barium sulfide and e) reacting said barium sulfide with alkali metal carbonate or bicarbonate to form barium carbonate.

2. A method according to claim 1, wherein the temperature in step a) is a temperature between 390° C. and 420° C.

3. A method according to claim 2, wherein the alkali metal carbonate or bicarbonate is sodium carbonate, potassium carbonate, sodium bicarbonate or potassium bicarbonate.

* * * * *